United States Patent [19]
Otten

[11] 3,959,631
[45] May 25, 1976

[54] WEDGE CODE AND READING THEREOF

[75] Inventor: Klaus W. Otten, Xenia, Ohio

[73] Assignee: NCR Corporation, Dayton, Ohio

[22] Filed: Aug. 9, 1974

[21] Appl. No.: 496,244

[52] U.S. Cl. .................. 235/61.12 N; 235/61.11 E
[51] Int. Cl.² .................. G06K 7/14; G06K 19/06; G01N 21/30
[58] Field of Search ............. 235/61.11 E, 61.12 M, 235/61.12 N

[56] References Cited
UNITED STATES PATENTS

| | | | |
|---|---|---|---|
| 3,643,068 | 2/1972 | Mohan et al. ................ | 235/61.11 E |
| 3,654,435 | 4/1972 | Vaccaro ..................... | 235/61.12 M |

Primary Examiner—Vincent P. Canney
Attorney, Agent, or Firm—J. T. Cavender; Wilbert Hawk, Jr.; George J. Muckenthaler

[57] ABSTRACT

A code made up of wedge-shaped elements representative in binary code for character reading of information. The area covered by the wedges is equivalent to selected printed characters and the reading is accomplished by a scanner which is pulsed at precise intervals or which is dynamic in operation, i.e. continuously reading or sensing the wedge as the scanner or the code is moved in a direction from one to the other end of the wedge in either an increasing or a decreasing area thereof. The scan profiles of the wedges are indicated during continuous reading thereof or from the reading or sensing thereof at precise points therealong and such profiles are then changed into transition profiles to determine polarity of change in timing or position of the information.

12 Claims, 6 Drawing Figures

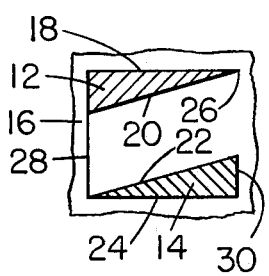
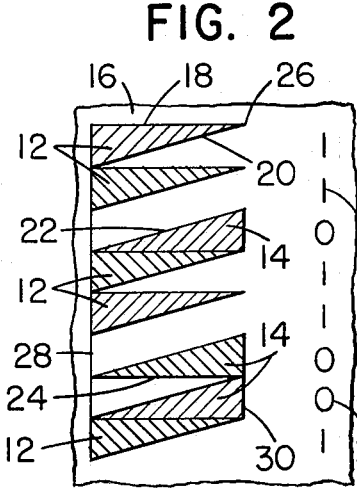
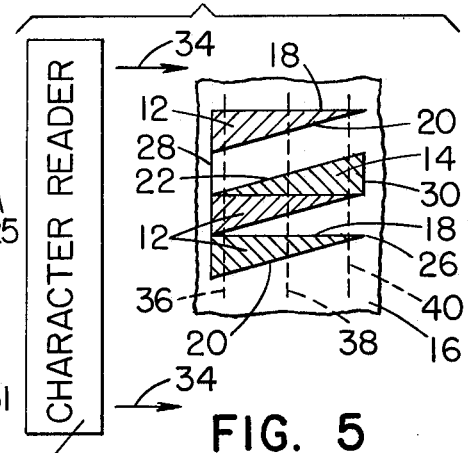
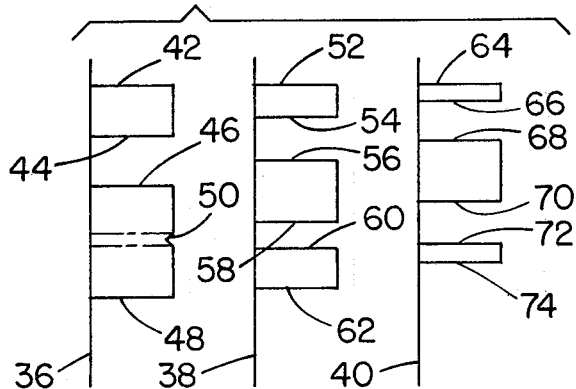
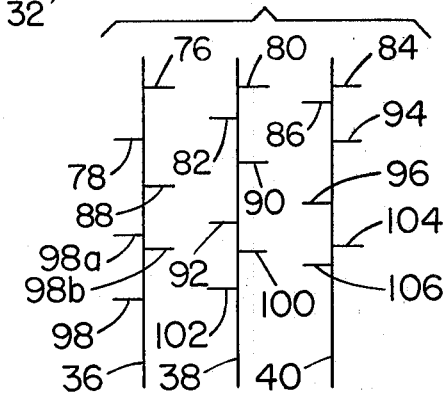
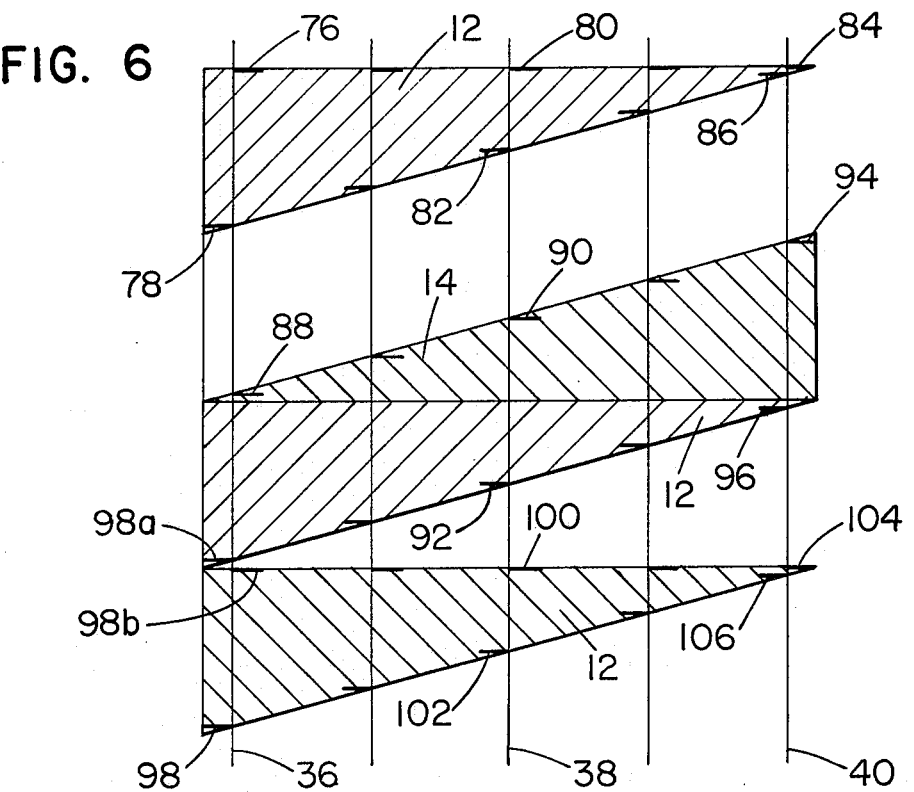

WEDGE CODE AND READING THEREOF

BACKGROUND OF THE INVENTION

In the field of modern merchandizing, tags or labels placed on various items of goods may include codes which are generally in bar form (optical or magnetic) with the bars spaced in precise arrangements to indicate certain information. And, while the use of black and white coded bars has been utilized with much success, other code arrangements are being pursued to obtain more flexibility and greater capacity for additional information.

Certain prior art relevant to the present invention is disclosed in U.S. Pat. No. 3,643,068, to W. L. Mohan et al., wherein a circular label is comprised of pie-shaped segments of different areas and a decoder scans the indicia on the circular label in a rotary fashion or in a circular sweep. The indicia is comprised of data bits, with each bit comprising a pair of contrasting areas, and the ratio of the areas defining the binary status of each bit.

Additionally, U.S. Pat. No. 3,654,435, to A. Vaccaro, discloses a magnetically readable bar and code wherein the code is formed of bars of magnetizable material and in which the ratio of the amplitude of the magnetic wave produced by the leading edges of the bars being moved past a character reading system is increased by slanting or inclining the leading edge of one bar with respect to the movement while maintaining the leading edge of the other type of bar perpendicular to the movement.

And, further, Willits et al. U.S. Pat. No. 3,743,820 discloses a rotary scanning decoder for reading labels having binary data bits, each of which comprises a pair of contrasting areas, the ratio of areas in each bit defining the bits' binary status. Once again, the label is circularly coded for scanning thereof by the sensor to thereby read the label in a circular path.

SUMMARY OF THE INVENTION

The present invention relates to information codes and more particularly to the use of wedge-shaped areas on a tag or label and arranged to indicate in binary form the information or indicia for reading by a scanner-type character reader. The basic binary code elements are wedges which in preferred form are horizontally oriented and arranged in vertical disposition so as to formulate a character by way of a stack of such horizontal wedges. Depending upon whether the wedges are arranged in ascending or descending order from a beginning reference point determines the binary 0 or binary 1 assigned to a respective wedge. From the reference point of maximum code element width to decreasing code element width is assigned binary 1, and from the reference point of minimum code element width to increasing code element width is assigned binary 0. The area covered by the wedges in the code is therefore equivalent to a value of the printed character and is capable of being read by a scanner which reads vertically as it moves from the reference point across the wedge code.

In the preferred form, the wedges are black with equivalent or corresponding white spaces therebetween to form the black and white wedge code, however, color wedge codes as well as magnetic wedge codes could be utilized for variations in the presentation of information.

In the preferred form of the invention, reading of the wedge code hereof is accomplished by mechanical motion of the reader or scanner in a direction corresponding with that of the increasing or decreasing width of the wedges, and the scanning at numerous points by the reader in its travel across the wedges to pick up or pulse the points of increasing or decreasing width of the wedges. These points or pulses can be magnified into scan profiles which show the area or extent of the wedge at the points of scan. The transition of such profiles leads to a positive or a negative indication wherein change in timing or position is derived by reason of observing the points of reading. At the start of scanning of the wedge code pattern, the required number of transitions is observed and the pulse energies determined as being proportional to the timing differences or the extent of pulse duration modulation. In this respect, it is the integration of such energies to timing differences that relates the bipolar integrators wherein one integrator is equivalent to one code bit. The polarity of the integrators is thus dependent upon the number of observed transitions and the use or decline thereof.

In an additional form of the invention, the reader or scanner is moved in a direction corresponding with that of the increasing or decreasing width of the wedges, and the scanning is dynamic in operation or in continuous manner when reading or sensing the increasing or decreasing width of the wedges. Since the information is contained in the polarity of rate of change along the increasing or decreasing extent of wedge patterns in relation to adjacent areas of discernible nature and to adjacent wedge patterns, a continuous reading or sensing of the wedges can be accomplished with more sophisticated reading or scanning equipment.

In view of the above discussion, the principal object of the present invention is to provide a code that is described in changes of signals dependent upon increasing or decreasing code format.

Another object of the present invention is to provide a wedge code which is of simpler design and requires a lesser number of bits for the character information.

An additional object of the present invention is to provide a wedge code pattern wherein the direction of incline of the wedge carries or represents the desired information.

A further object of the present invention is to provide a reading system of such wedge code pattern wherein the reading is dynamic in operation and is based on the sensing of change in ratio of the wedge to non-wedge portion of the sensed area.

Additional features and advantages will become apparent and fully understood from a reading of the following description taken together with the annexed drawing, in which:

FIG. 1 is a diagrammatic representation of the basic wedge code of the present invention;

FIG. 2 is a diagrammatic view of a stack of horizontal wedges in 8-bit character form, together with the binary values assigned thereto;

FIG. 3 is a diagrammatic view of the code and the pulse form reading thereof;

FIG. 4 is a diagrammatic view of the profiles obtained from reading of the code;

FIG. 5 is a diagrammatic view of the transition profiles of the wedge code; and

FIG. 6 is a diagrammatic view of the derivation of the information or decoding of the wedge code.

Referring now to the drawing, FIGS. 1 and 2 show the general configuration of the code in a horizontal orientation wherein basic binary code elements in two bit and eight bit character arrangements are provided, the elements being designated as 12 and 14 imprinted or otherwise formed on a label 16 or the like for reading thereof by a character reading system. A character is formed and is read from a stack of such wedge code elements wherein each wedge element comprises an upper and a lower edge, the element 12 having an upper edge 18 and a lower edge 20 in one configuration thereof, and the element 14 having an upper edge 22 and a lower edge 24. Each of the wedge elements is designated binary 1 or binary 0 depending upon the desired code and format, it being seen that wedge element 12 represents the binary code 1, designated as 25, and has the horizontal edge 18 at the top and an inclined edge 20 at the bottom, with edge 20 meeting edge 18 at the apex 26, and with the edges 18 and 20 originating at a beginning reference point or line 29. Edge 22 of element 14, which represents the binary code 0 designated as 31, starts at the reference line 28 and inclines upwardly at the same angle as edge 20 of element 12 and terminates at the base 30 corresponding to the extent of apex 26, with the edge 24 originating at the reference line 28 and terminating at the base 30.

In FIG. 2 is shown the configuration for an 8-bit character made up of a combination of the wedges 12 and 14, shown and described in FIG. 1, with the corresponding binary 1 and binary 0 notations thereof, it being seen that the respective wedge elements are again set out or formed in a horizontal orientation starting at the reference line 28 and terminating either at the apex 26 or the base 30.

In FIG. 3 is shown the principle involved for a four-bit character with a character reader 32 operable to move in the direction of the arrow 34, the reader 32 capable of being pulsed three times at points or planes 36, 38, 40 to vertically scan the wedges thereat during its travel across the label 16 — that is, the scanning being normal to the direction of reader movement. It is seen that at point 36, the reader picks up a large portion of each of the three code elements 12 and a small portion of the element 14; at point 38, the reader picks up approximately an equal portion of each of the three elements 12 and of the element 14; and at point 40, the reader picks up a small portion of each of the elements 12 and a large portion of element 14. Of course, as more elements than four are stacked, the reader likewise scans such additional elements at the various points 36, 38 and 40 as desired to determine the value thereof.

The result of scanning at such points 36, 38, 40 of the elements 12, 14 of FIG. 3 is shown in a magnified profile wherein the projection at point 36 of the upper element 12 has a magnitude from a line 42 to a line 44 and corresponding to the vertical extent of code element 12 at such point 36. The projection of a small portion of element 14 at point 36, the projection of element 12 below element 14 and adjacent thereto, and the projection of the lower element 12 have a combined magnitude from a line 46 to a line 48 with a slight break or blip occurring at 50 denoting the small absence of code element between the two lower elements 12 at such point 36. Moving now to the reading of the elements at point 38, or near the center of travel of the scanning by the reader 32, the upper element 12 has a magnified scan profile from a line 52 to a line 54, the center-placed adjacent elements 14 and 12 have a combined magnitude from a line 56 to a line 58, and the lower element 12 is depicted as a magnified projection or profile from a line 60 to a line 62. The third pulse taken at point 40 of upper element 12 and near the right side of the wedge code is indicated in profile from a line 64 to a line 66, the profile of adjacent elements 14 and 12 is of similar magnitude as at point 38 and extends from a line 68 to a line 70, and the lower element 12 has a smaller magnitude from a line 72 to a line 74. It is thus seen that the profiles represented in FIG. 4 are repeated in similarity as to extent thereof depending upon the point at which the pulse is taken.

While the above discussion refers to reading or scanning at the planes 36, 38, and 40, it can be appreciated that in the majority of readings not all three reading planes are required to determine if the information is binary 1 or binary 0. For example, as seen from FIG. 3, it is only necessary to scan at plane 36, in reading from left to right, to determine that the upper wedge code 12 represents a binary 1 and that the lower wedge code 12 represents a binary 1 by reason of the extent of the wedge at this plane, the magnitude of the wedge being greater for binary 1 at plane 36 and the magnitude of the wedge being lesser for binary 1 at planes 38 and 40. Likewise, in reading from right to left, the magnitudes are lesser at reading plane 40 from that just stated for reading plane 36. For the combined wedges 12 and 14, a reading at plane 36 indicates a lesser magnitude for binary 0 and a greater magnitude for binary 1 in reading from left to right and a reversal of magnitude at plane 40 when reading from right to left, so that only one reading plane may be necessary to obtain the binary information. A scan at plane 38 would require a reading at another plane by reason of the magnitude of binary 1 to 0 being equal. The use of other planes for reading can be extremely valuable when checking the system to determine if the information is coded properly or in those cases where more accuracy is required.

Corresponding to the scan profiles in FIG. 4 are the transition profiles shown in FIG. 5, again indicated for pulsing at points 36, 38, and 40, the marks of such transition profiles being shown as short lines on either side of the pulse points in a positive or negative manner with mark 76 corresponding to line 42, mark 78 corresponding to line 44, mark 80 to line 52, mark 82 to line 54, mark 84 to line 64, and mark 86 to line 66, to complete the transition profile of the upper element 12. The adjacent elements 14 and 12 show a transition mark 88 corresponding to line 46, mark 90 corresponding to line 56, mark 92 to line 58, mark 94 to line 68, and mark 96 to line 70, it being seen that at point 36 the mark 98a corresponds to the beginning of blip 50, mark 98b with the end of blip 50, mark 98 to line 48, and with mark 100 to line 60, mark 102 to line 62, mark 104 to line 72, and mark 106 to line 74.

The decoding or derivation of the information is shown in FIG. 6 wherein such information is regarded as a polarity change in timing or position of the marks in an overlay of the elements. While additional marks are shown in FIG. 6 over and above those relating to planes 36, 38, and 40 of FIG. 5, the marks 76–86 represent the transition profile in relation to the code element 12, the marks 88–98a represent the profile in relation to adjacent code elements 14 and 12, and marks 98b–106 (including 98) represent the profile in relation to the lower code element 12. As mentioned above, the number of wedge code elements shown for scanning by the reader 32, together with the scan and transition profiles, and the decoding thereof indicate the principle for a 4-bit character, however the principle is identical for an 8-bit character. Also, while the illustrated direction of movement of the reader 32 is from left to right, per the arrow 34 in FIG. 3, it is apparent that the code and apparatus hereof will accommodate right to left or fore and aft operation if so desired.

In the case of a dynamic or continuous reading or scanning of the wedges to sense the change in ratio of the wedge to non-wedge portions of discernible nature, the reading is accomplished in a left to right direction in FIG. 3 in relation to the reference line or plane 28, or such reading may be from right to left, if so desired. In this respect, the reader movement or motion is thereby limited to such side to side direction by reason of the continuous change in ratio of the code pattern.

It is thus seen that herein shown and described is a wedge coded element and apparatus for reading thereof wherein the direction of incline of the wedge carries or represents the information, and wherein the reading of the code elements is dynamically performed and based on the sensing of the change in ratio of the wedge to non-wedge portions of the sensed area of the tag or label. While only one embodiment of the invention has been disclosed herein, certain variations thereof may occur to those skilled in the art. It is contemplated that all such variations, not departing from the spirit and scope of the invention hereof, are to be construed in accordance with the following claims.

What is claimed is:

1. A binary data code comprising a plurality of code elements arranged in format to present adjacent areas of discernible portions corresponding to bit characters of data, each of said code elements being triangular shaped and defining widths of increasing or decreasing magnitude along the elements length in relation to a reference line, and means for reading each code element at a plurality of planes along the length thereof for identifying the corresponding bit character by sensing the change is magnitude of the widths of one code element in relation to the widths of an adjacent element.

2. The code of claim 1 wherein said code elements are oriented in one direction and include laterally directed edges and inclined edges and said reading means scans in a direction normal to said one direction for sensing the edges of said elements in a change of magnitude of said portions.

3. The code of claim 1 wherein said discernible portions are defined by black and white areas.

4. The code of claim 1 wherein said discernible portions are defined by magnetic and non-magnetic areas.

5. The code of claim 1 wherein said discernible portions are defined by one and another color areas.

6. The code of claim 1 wherein said code elements are wedge-shaped and present a laterally directed edge and an inclined edge initiating in spaced relationship at said reference line and meeting at an apex distal from said reference line.

7. The code of claim 1 wherein said code elements are wedge-shaped and present a laterally directed edge and an inclined edge connecting at said reference line and initiated in spaced relationship at a base distal from said reference line.

8. The code of claim 1 wherein said code elements are oriented in one direction and said reading means scans in a direction normal to said one direction for sensing the change in magnitude of said discernible portions.

9. In a binary data code comprising a plurality of wedge-shaped code elements arranged to provide discernible areas adjacent each other and denoting character bits of information, each of said code elements defining widths of increasing or decreasing magnitude along the elements length in relation to a reference line at one side thereof, and means for reading the code elements at a plurality of planes along the length thereof by sequentially sensing the change in magnitude of the width of the discernible area of one code element in relation to the change in magnitude of the width of the discernible area of an adjacent code element.

10. In the code of claim 9 wherein said code elements are arranged in one direction and said reading means travels in said one direction for sensing the change in ratio of said discernible areas.

11. In the code of claim 9 wherein said code elements present a laterally directed edge and an inclined edge initiating in spaced relationship at said reference line and meeting at a point distal from said reference line.

12. In the code of claim 9 wherein said code elements present a laterally directed edge and an inclined edge connected to define a point at said reference line and include an edge normal to said laterally directed edge interconnecting said inclined edge distal from said point.

* * * * *